United States Patent

[11] 3,595,011

| [72] | Inventors | Firl W. Nicholson<br>Columbus, Ohio;<br>Gifford E. Rauberts, Morristown, Tenn. |
|---|---|---|
| [21] | Appl. No. | 849,329 |
| [22] | Filed | Aug. 12, 1969 |
| [45] | Patented | July 27, 1971 |
| [73] | Assignee | Jeffrey Galion Inc.<br>Original application May 27, 1968, Ser.<br>No. 732,384, now Patent No. 3,518,892.<br>Divided and this application Aug. 12, 1969,<br>Ser. No. 849,329 |

[54] METHOD OF FORMING CHAIN SIDE BARS WITH CURVED BEARING SURFACES
21 Claims, 26 Drawing Figs.

[52] U.S. Cl. ................................................ 59/8
[51] Int. Cl. ........................................... F16g 13/06
[50] Field of Search .......................................... 59/8, 5, 6, 10, 15, 12, 13, 35 CP

[56] References Cited
UNITED STATES PATENTS

| 1,881,631 | 10/1932 | Jewett | 59/8 |
| 2,412,364 | 12/1946 | Sivyer | 198/172 |
| 2,869,380 | 1/1959 | Lemmon | 74/245 |
| 3,062,067 | 11/1962 | Deming | 74/245 |
| 3,092,957 | 6/1963 | Larkin | 59/8 |
| 3,370,416 | 2/1968 | Edgerton | 59/8 |
| 3,410,084 | 11/1968 | Cain | 59/8 |

Primary Examiner—Charles W. Lanham
Assistant Examiner—Gene P. Crosby
Attorney—David Young ABSTRACT: Method of forming side bars of chain links with inwardly curved bearing surfaces by mechanical deformation of the bearing surfaces, and the bearing surfaces may also be laterally expanded by the mechanical deformation.

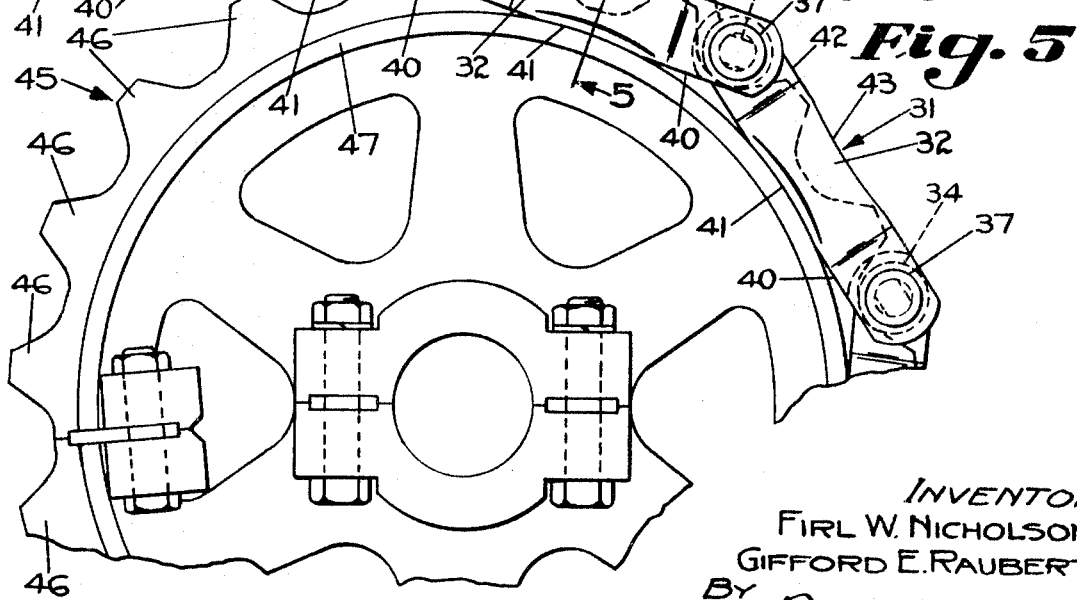

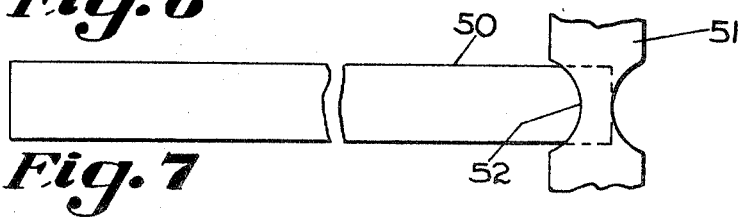
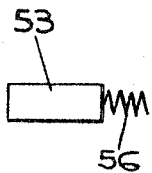
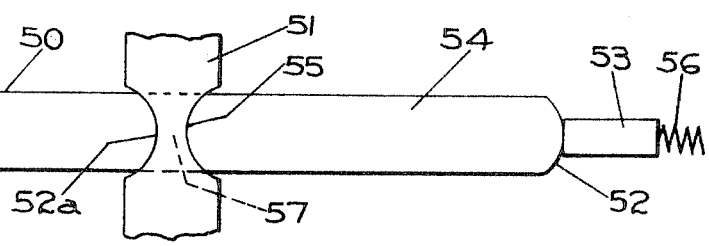

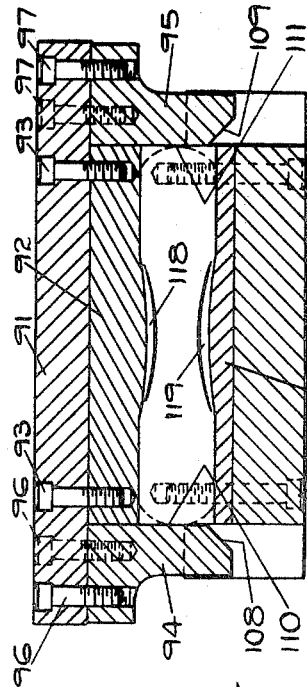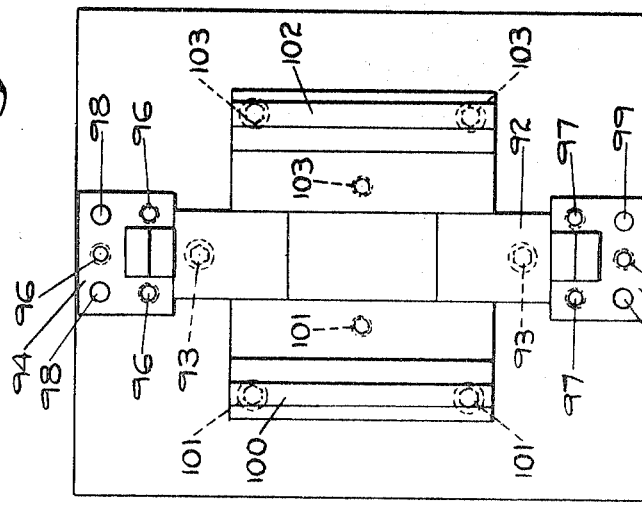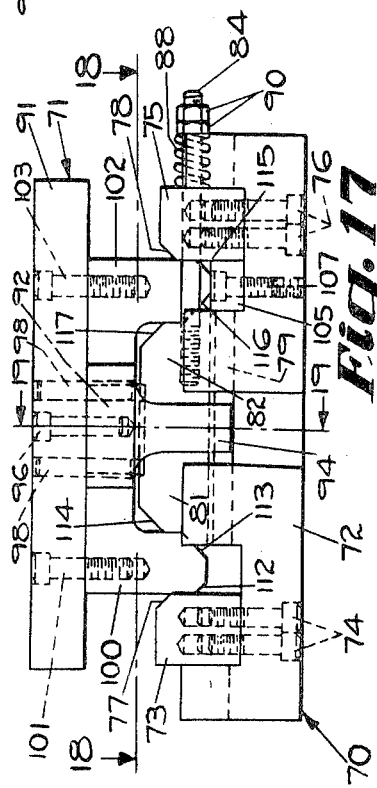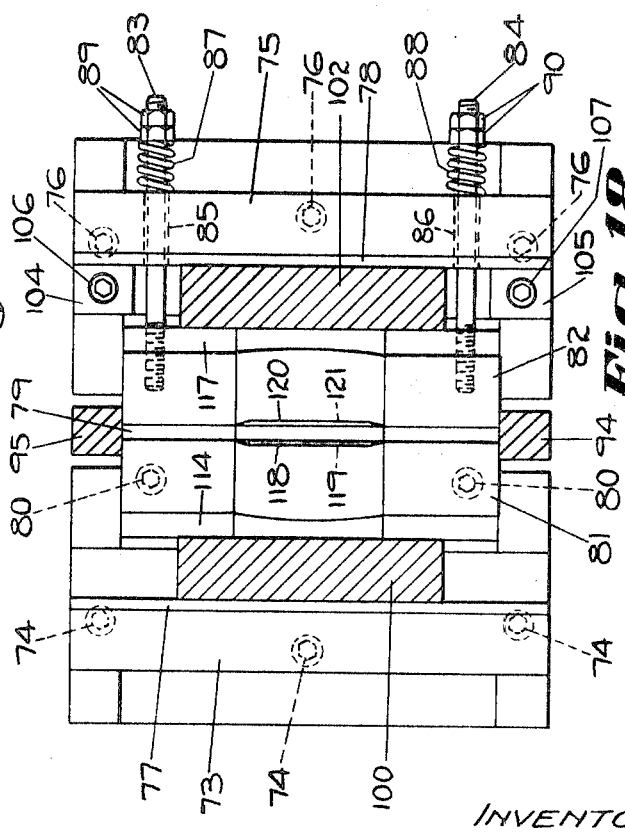

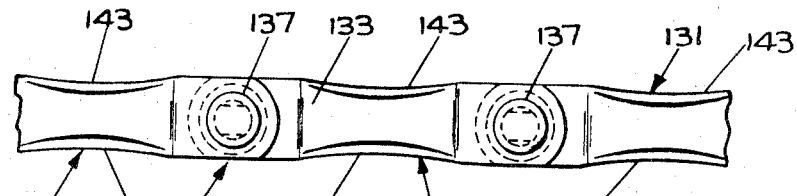
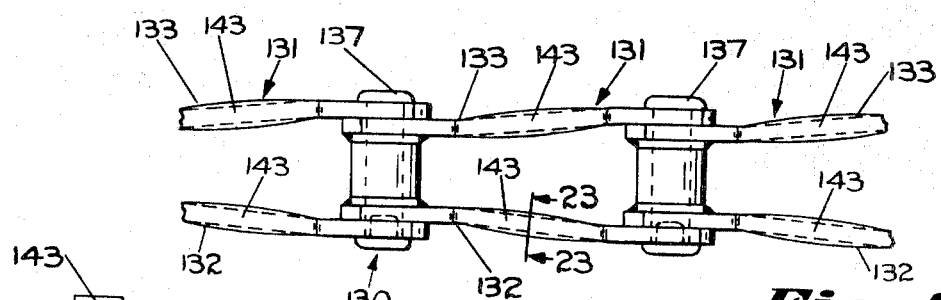
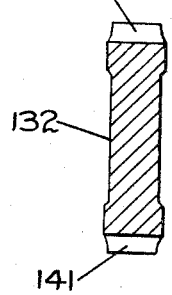
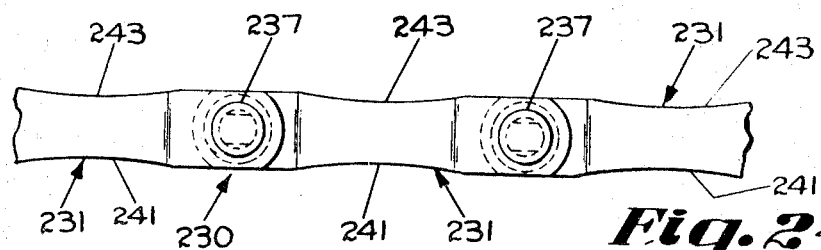
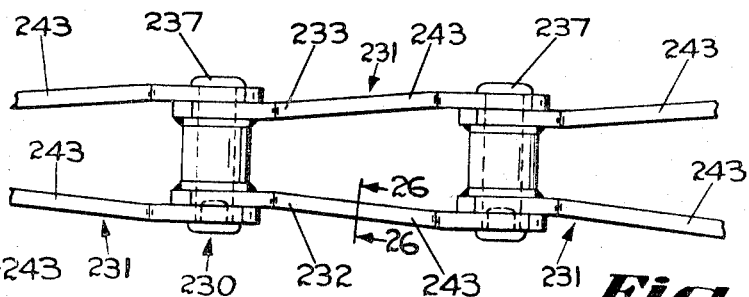

METHOD OF FORMING CHAIN SIDE BARS WITH CURVED BEARING SURFACES

This is a division of application Ser. No. 732,384, filed May 27, 1968, and now U.S. Pat. No. 3,518,892.

The instant invention relates to method of forming chain side bars with curved bearing surfaces on the edge surfaces of the side bars to fit a sprocket wheel with which the chain operates.

Chains are customarily produced with a plurality of chain links that are joined to each other in succession by articulated means, which may be pins that permit movement of the chain links relatively to each other. The chains can follow a curved path and work with a circular sprocket wheel that drives the chain, or the chain may drive the sprocket wheel. The chain, of course, is a power-transmitting device.

Chain links which work with sprocket wheels have been formed with curved bearing surfaces on the edge surfaces of the side bars to fit the curvature of the sprocket wheel and support the chain links on the sprocket wheel rims while the sprocket wheel teeth are in engagement with the chain links. The curbed bearing surfaces for the chain links on the sprocket wheel cause the load to be distributed over a greater area, and the chain life is materially increased, and the chain wearing characteristics are improved.

Chain links have been produced by casting, by which it is possible to form the link as an integral element having the desired configuration and size. Such a link is illustrated in the patent to A. W. Lemmon, U.S. Pat. No. 2,869,380, dated Jan. 20, 1959. To produce a cast chain link it is necessary to make a pattern, which is then used to form molds with cavities that have the configuration of the chain link pattern. Molten metal is poured into such molds and the casting that is so produced has the desired chain link configuration and size.

Cast chain links are subject to the same problems as generally encountered in the production of cast products. These largely involve castings defects, such that there is a substantial number of rejects. Defects of the cast product may be found by inspection of the product, but it is also often the case that defects of the cast product are concealed within the product, and are not apparent until there is a failure of the product due to such defect.

The chain is materially improved by producing the chain links from material which may be more consistently controlled with respect to the quality than is the case with cast materials, for example, steel material. Steel is available in a variety of raw stock forms which can be used for various parts of the chain links. However, the chains which are used with sprocket wheels require the curved bearing surfaces on the edge surfaces of the chain link side bars. In accordance with this invention, the curved bearing surfaces are formed by mechanically deforming the side bars to the curved configuration. Further, the curved bearing surfaces of the side bars are expanded laterally to form the bearing surfaces with an increased area for supporting the bearing load between the chain links and the sprocket wheel.

It is an object to provide an improved chain for a sprocket wheel, with the chain link side bars formed with curved bearing surfaces for engaging the sprocket wheel.

It is another object to provide an improved chain for a sprocket wheel, in which the surfaces of the side bars are mechanically deformed to a curved configuration to fit the curvature of the sprocket wheel.

It is a further object to provide an improved chain in which the edge surfaces of the chain link side bars are mechanically deformed to be inwardly curved and laterally expanded to provide bearing surfaces for engagement with the sprocket wheel on which the chain operates.

It is also an object to provide an improved chain in which the opposite edge surfaces of the chain link side bars are inwardly curved so that the chain may be operated on either side with a sprocket wheel.

It is still another object to provide an improved chain in which the opposite edge surfaces of the chain link side bars are inwardly curved and laterally expanded to provide bearing surfaces on each side of the chain for use with a sprocket wheel with which the chain operates.

It is still a further object to provide an improved method of producing chain link side bars, in which the edge surfaces of the side bars are mechanically deformed to be inwardly curved.

It is still another object to provide an improved method of producing side bars for a chain, in which the edge surfaces of the side bars are mechanically deformed to be inwardly curved and laterally expanded to form bearing surfaces on the edge surfaces of the side bar.

It is yet another object to provide an improved method of producing side bars for a chain in which the opposite edge surfaces are mechanically deformed to be inwardly curved to form bearing surfaces on the opposite edge surfaces of the side bars.

It is yet a further object to provide an improved method for producing chain link side bars in which the opposite edge surfaces are mechanically deformed to be inwardly curved and laterally expanded to form bearing surfaces on the opposite edge surfaces of the side bars.

Other objects of the invention will appear hereinafter, the novel features and combinations being set forth in the appended claims.

In the drawings:

FIG. 1 is a side elevational view of a chain constructed in accordance with this invention;
FIG. 2 is a plan view of the chain;
FIG. 3 is a sectional view on the line 3-3 in FIG. 2;
FIG. 4 shows the chain in engagement with a sprocket wheel;
FIG. 5 is a sectional view on the line 5-5 in FIG. 4;
FIG. 6 shows the raw bar stock for the side bars;
FIG. 7 shows the initial punching operation;
FIG. 8 shows the punching operation to produce a blanked side bar;
FIG. 9 shows a blanked side bar;
FIG. 10 is a plan view of the blanked side bar;
FIG. 11 shows the mechanically deformed side bar;
FIG. 12 is a plan view of the deformed side bar;
FIG. 13 shows the offset side bar;
FIG. 14 is a plan view of the offset side bar;
FIG. 15 shows the finished side bar;
FIG. 16 is a plan view of the finished side bar;
FIG. 17 is an elevational view of the dies for mechanically deforming the side bar blanks;
FIG. 18 is a sectional view on the line 18-18 in FIG. 17;
FIG. 19 is a sectional view on the line 19-19 in FIG. 17;
FIG. 20 is a bottom plan view of the upper die part;
FIG. 21 is an elevational view of another form of chain in accordance with this invention;
FIG. 22 is a plan view of the chain of FIG. 21;
FIG. 23 is a sectional view on line 23-23 in FIG. 22;
FIG. 24 is an elevational view of another form of chain in accordance with this invention;
FIG. 25 is a plan view of the chain of FIG. 24; and
FIG. 26 is a sectional view on the line 26-26 in FIG. 25.

Referring to the drawings, there is illustrated in FIGS. 1 and 2 a chain 30 with a plurality of chain links 31,31, connected to each other in succession. The several chain links 31,31 are all of the same form. Each link 31 has opposite side bars 32,33 which are laterally spaced from each other by a transverse barrel 34, the length of which determines the lateral spacing. The side bars 32,33 diverge from the barrel 34 to provide sufficient width for receiving the barrel end of the next chain link 31 between the free ends of the side bars 32,33. In the chain 30, the side bars 32,33 and the barrel 34 may be formed of steel. The barrel 34 is secured to the side bars 32,33 by welding 35,36, respectively, around the ends of the barrel 34 adjacent the side bars 32,33.

The successive chain links 31,31 are connected by a transverse pin 37 which extends through the free ends of the side bars 32,33 of one chain link 31, and the barrel ends of the side bars 32,33 of the next chain link 31, and through the barrel 34. The pin 37 is formed with a flattened end 38 to be received in a similarly formed hole in the free end of the side bar 32. This fixes the position of the pin 37 relatively to the free ends of the side bars 32,33, and the relative rotation is between the pin 37 and the barrel 34, along with the barrel ends of the side bars 32,33. The pin 37 is a rivet pin, but other forms of pins may be used.

The lower edge surface 40 of each of the side bars 32,33, as view in FIG. 1, is inwardly curved and laterally expanded to form a curved bearing surface 41. The upper edge surface 42 of each of the side bars 32,33 is inwardly curved to form a curved bearing surface 43 on the upper edge surface 42. The curved bearing surfaces 41,43 are formed by mechanically deforming the lower and upper edge surfaces 40,42 of each of the side bars 32,33, as will be explained hereafter.

In FIGS. 4 and 5 there is illustrated a sprocket wheel 45 with which the chain 30 works. The sprocket wheel 45 has a plurality of teeth 46,46 on its periphery which engage the barrels 34 of the successive chain links 31. On opposite sides of the sprocket 45 there are annular rims or flanges 47,48 which extend in opposite lateral directions below the sprocket teeth 46,46. The curvature of the bearing surfaces 41 of the side bars 32,33 fits the curvature of the rims 47,48, respectively, to seat the successive chain links 31 on the rims 47,48, and to support the load of the chain 30 on the sprocket 45. In FIG. 5 there is shown the seating of the side bars 32,33 on the rims 47,48, respectively.

In the chain links 31, as illustrated in FIGS. 1 to 5 and described above, the bearing surfaces 41 are formed by a mechanical deformation of the lower edge surfaces 40 of the side bars 32,33, in which the lower edge surfaces 40 are curved inwardly and expanded laterally in opposite directions. The lateral expansion of the bearing surfaces 41 occurs in the mechanically deformed portion of the side bars 32,33 and is of greatest lateral dimension in the midlength portion of each bearing surface 41 and is progressively narrower towards the ends of the bearing surface 41. On the upper edge surfaces 42 of the side bars 32,33, the curved bearing surfaces 43 are also formed by a mechanical deformation of the upper edge surfaces 42, which curves the upper edge surfaces 42 inwardly, but there is no apparent lateral expansion of the bearing surfaces 43. In the application of the chain 30 to the sprocket wheel 45, either of the curved bearing surfaces 41,43 may be placed on the rims 47,48. However, the curved bearing surfaces 41 initially are placed on the rims 47,48 because these bearing surfaces have a materially greater area, which produces longer and better wear service of the chain 30. The bearing surfaces 43 may then be used as alternate bearing surfaces when the chain 30 is turned over, after the wear on the one side of the chain 30 has progressed to the point that it is no longer acceptable. The curved bearing surfaces 43 do not provide the same service life as the expanded curved bearing surfaces 41 because of their lesser surface area. However, this need not be significant because other parts of the chain 30, such as the barrel 34 and pins 37, are also subject to wear and may wear out before the bearing surfaces 43 are fully utilized.

Referring to FIGS. 6 through 16, the side bars 32,33 are illustrated in the successive steps of production. Raw stock 50 is used as the material for the side bars 32,33, and this may be flat steel bar stock, of random length, and with a rectangular sectional shape which conforms to the selected size of the side bars 32,33. The stock 50 is fed into a press, as illustrated in FIG. 7, in which a parting punch 51 punches the end of the stock 50 to form the curved end 52. The stock 50 is then advanced beyond the parting punch 51 until the curved end 52 abuts a stop bar 53 which determines the length of the side bar blank 54. The parting punch 51 is then operated to produce the other curved end 55 of the side bar blank 54 and the curved end 52a, on the remaining length of the stock 50. The stop bar 53 is backed by a spring 56 which permits the stop bar 53 to yield when the parting punch 51 is operated to produce the blank 54. When the punch 51 hits the material, it may produce a slight elongation or movement of the blank 54, and the yieldable stop bar 53 permits such elongation. The side bar blank 54 and the scrap part 57, below the parting punch 51, are removed, and the stock 50 is then advanced until the curved end 52a abuts the stop bar 53 to form the next side bar blank 54 by operation of the parting punch 51. When the stock 50 is exhausted, another like piece of stock 58 is fed in immediately behind the stock 50 to make the punching operation continuous. The blank 54 is illustrated in elevation and plan views in FIGS. 9 and 10. The blank 54 may also be formed by a blanking punch instead of the parting punch 51.

The side bar blank 54 is formed with opposite side surfaces 60,61 and opposite edge surfaces 62,63. The edge surfaces 62,63 of the side bar blank 54 are mechanically deformed to curve them inwardly towards the longitudinal centerline of the blank 54, as seen in FIGS. 11 and 12. This operation produces the inwardly curved bearing surfaces 64,65. In producing the bearing surfaces 64,65 on the blanks 54, there is a substantial lateral expansion of the bearing surface 64 and a lesser or minor lateral expansion of the bearing surface 65, which may not even be apparent.

The side bar blank 54 is then offset to produce the divergence of the side bars, as illustrated in FIG. 2, for the barrel end of one chain link 31 to fit between the side bars 32,33 of the next chain link 31. The offset blank 54 is illustrated in FIGS. 13 and 14, wherein it is seen that the end portions of the blank 54 are parallel to each other, but are laterally offset.

The next operation is that of punching and shaving the holes 66,67 in the blank 54. The pin 37 extends through the holes 66,67, and the hole 67 is flattened along chordal lines for the flat end 38 of the pin 37. The punching of the holes 66,67 establishes the pitch of the chain.

The dies by which the curved bearing surfaces 64,65 on the blanks 54 are produced, are illustrated in FIGS. 17 to 20. There is a fixed lower die 70 and a movable upper die 71, which can be mounted in a press. The movable die 71 is moved upwardly and downwardly to form the curved bearing surfaces 64,65 on each blank 54. The lower die 70 has a base part 72. A left guide block 73 is secured to the base part 72 by several cap screws 74. A right guide block 75 is secured to the right side of the base part 72 by several cap screws 76. The guide block 75 is oppositely disposed relative to the guide block 73. An inclined guide surface 77 is formed on the guide block 73, and a similar inclined guide surface 78 is formed on the guide block 75. A curved bottom die part 79 is secured to the base part 72 by a pair of capscrews 70. Above the curved die part 79 there is a fixed side die part 81 which is secured in fixed position by the capscrews 80 which extend upwardly through the base part 72 and the curved bottom die part 79, and are threaded into the fixed side die part 81.

A movable side die part 82 is similar to the fixed side die part 81, but is oppositely disposed relatively to the latter. Rods 83,84 are threaded into the side of the movable side die part 82. The rods 83,84 extend loosely through holes 85,86 in the guide block 75. Compression springs 87,88 are on the rods 83,84, respectively, outside of the guide block 75, and are secured by nuts 89,90 that are turned on the threaded ends of the rods 83,84. The compression springs 87,88 tend to expand between the guide block 75 and the nuts 89,90, with the effect of pulling the movable side die part 82 away from the fixed side die part 81. The underside of the movable side die part 82 is curved to fit on the curved bottom die part 79 and to slide freely back and forth on the latter.

The movable upper die 71 has a top plate 92 to which there is secured an upper curved die part 92 by a pair of capscrews 93. Opposite end stops 94,95 are secured to the top plate 91 by several capscrews 96,97, respectively, and dowel pins 98,99, respectively. A side guide 100 is secured to the top plate 91 by several capscrews 101, and another side guide 102 is secured to the top plate 91 by several capscrews 103.

The fixed lower die 70 and the movable upper die 71 are illustrated in FIG. 17 in mated position. In operation the upper die 71 is raised to a position in which the side guides 100,102 clear the side die parts 81,82. The side die part 82 is movable outwardly by the springs 87,88, until the movable side die part 82 abuts the stop blocks 104,105 which are fixedly secured to the base part 72 by capscrews 106,107, respectively. This opens the centrally disposed recess between the side die parts 81,82 for the reception of a bar blank 54 on the bottom curved die part 79 and between the side die parts 81,82. Then the upper die 71 is moved downwardly to mechanically deform the edge surfaces 62,63 of the blank 54. In the downward stroke of the upper die 71, the inclined surfaces 108,109 of the end stops 94,95 will contact the curved ends 52,55 of the blank 54 to center it between the side die parts 81,82. The upright inner faces 110,111 of the end stops 94,95 are opposite the ends of the blank 54. At the same time, the side guide 100 is descending between the guide block 73 and the fixed side die part 81, and the side guide 102 is descending between the guide block 75 and the movable side die part 82. The inclined surface 112 and the inclined surface 113 of the side guide 100 will slide down the inclined surface 77 of the guide block 73, and the inclined surface 114 of the side die part 81, respectively, centering the side guide 100 between the guide block 73 and the side die part 81. Similarly, the inclined surface 115 and the inclined surface 116 of the side guide 102 slide down the inclined surface 78 of the guide block 75, and the inclined surface 117 of the movable side die part 82, respectively, centering the side guide 102 between the guide block 75 and the side die part 82. Further, the side guide 102 operates with a camming action on the movable side die part 82 to move it laterally towards the blank 54, and overcoming the force of springs 87,88. There is produced a clamping engagement of the side die parts 81,82 against the side surfaces 60,61 of the bar blank 54 to hold the side surfaces in confinement. The side die parts 81,82 are backed by the side guides 100,102 to maintain the clamping engagement on the side surfaces 60,61 of the bar blank 54.

The upper die 71 is moved downwardly towards the lower die 70 with a force of such magnitude that when the upper curved die part 92 engages the bar blank 54, it mechanically deforms the edge surface 62 of the latter to the curvature of the curved die part 92. At the same time, the bar blank 54 is forced against the lower curved die part 79 so that the edge surface 63 is also mechanically deformed to the curvature of the bottom curved die part 79. The lower and upper surfaces of the side die parts 81,82 are curved so as to mate with the lower curved die part 79 and the upper curved die part 92. Further, the fixed side die part 81 has an upper recess 118 and a lower recess 119, and similarly, the movable side die part 82 has an upper recess 120 and a lower recess 121. At the same time that the side bar blank 54 is mechanically deformed by the curved lower and upper dies 79,92, the several recesses of the side die parts 81,82 permit the mechanically deformed material to flow into these recesses. There may tend to be an elongation of the bar blank 54 when it is mechanically deformed. However, the blank 54 is constrained by the opposite end stops 94,95.

In producing the side bars 32,33 by the method which has been described, and using the dies 70,71, there is produced a very pronounced lateral expansion of the material into the recesses 118,120 of the side die parts 81,82. However, there is a lesser or minor lateral expansion of the material into the recesses 119,121 of the side die parts 81,82. Thus there is a very apparent increase of the surface area of the bearing surface on one edge surface of the side bar, but the increased bearing surface area is not apparent on the other edge surface of the side bar. The recesses 118,119,120,121 are formed with straight sides, but in operation of the dies 70,71 the expansion of the material into the recesses 118,119,120,121 does not completely fill these recesses, and the expanded part is curved, rather than being straight.

In the method of producing the side bars, which has been described, the bar blanks 54 are cold worked and the mechanical deformation occurs by the swagging action of the upper and lower curved die parts 92,79 on the blank 54. The bar blanks 54 may be induction heated on the edge surfaces 62,63 to put these in a softened condition prior to being mechanically deformed. Such localized heating would facilitate the mechanical deformation of the bar blanks 54, but requires additional equipment and may materially slow down the production of the side bars, as well as increasing the expense.

Referring to FIGS. 21, 22 and 23, there is shown the chain 130 which has successive chain links 131 which are connected to each other in succession by pins 137 which form articulated connections of the chain links 131. Each chain link 131 has side bars 132,133. In this form of the chain, each of the curved bearing surfaces 141,143 is curved inwardly towards the longitudinal center line of the side bars 132,133, and is also substantially expanded laterally, so that the surface area of each of the bearing surfaces 141,143 is materially increased. The lateral expansion of the bearing surfaces 141,143 is similar to the lateral expansion of the bearing surfaces 41, as illustrated in FIGS. 1, 2 and 3.

Referring to FIGS. 24, 25 and 26, there is shown still another form of the chain 230, in which the successive links 231 are connected to each other by pins 237 to form the articulated connections of the chain links 231. The opposite bearing surfaces 241,243 of the side bars 232,233 are curved inwardly towards the longitudinal center line of the side bars 232,233. However, there is no apparent lateral expansion of the side bars 232,233, and the appearance is that there is no increase of the area of the bearing surfaces 241,243. In these side bars 232,233, the material is distributed in the side bars so that a localized expansion of the curved bearing surfaces does not appear.

The chains 130,230, as illustrated in FIGS. 21—26, are formed by mechanical deformation of the edge surfaces of the side bars. The amount of lateral expansion of the edge surfaces, whether it be substantial as illustrated in FIGS. 21-23 or not apparent as illustrated in FIGS. 24—26, is determined by control of the displacement or movement of the material during the mechanical deformation of the edge surfaces of the side bars. This may call for a greater or lesser clamping on the side surfaces of the side bar blanks to control the material.

In the chain which is described herein, the curved bearing surfaces are produced by a mechanical deformation of the edge surfaces of the side bars, with a lateral expansion during the mechanical deformation of the edge surfaces, such that the curved bearing surface has a materially greater bearing area to support the load of the chain on a sprocket wheel. The mechanical deformation can be by a cold working of the edge surfaces of the side bars, which has the further advantage of producing an increased hardness of the bearing surfaces to further improve the wear characteristics of the chain. Also, the steel, which is used as the material for the chain links may be heat treated to further improve its wearing characteristics.

Obviously, those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

We claim:

1. The method of producing a side bar for a chain link comprising the steps, blanking the side bar from stock material to a predetermined length with opposite side surfaces and opposite edge surfaces, clamping the side bar on the opposite side surfaces thereof to hold the side bar and to support the opposite side surfaces in confinement, and mechanically deforming at least one edge surface of the side bar to an inwardly curved form while the side bar is held and the opposite side surfaces thereof are supported in confinement to provide a curved bearing surface on the one edge surface of the side bar.

2. The method of producing a side bar for a chain link as recited in claim 1 in which said one edge surface of the side bar is mechanically deformed by swagging the edge surface with a curved die.

3. The method of producing a side bar for a chain link as recited in claim 1 in which each of said opposite edge surfaces of the side bar is mechanically deformed to an inwardly curved form while the side bar is held with the opposite side surfaces thereof supported in confinement to provide a curved bearing surface on each of the opposite edge surfaces of the side bar.

4. The method of producing a side bar for a chain link as recited in claim 3 in which one edge surface of the side bar is placed on a fixed curved die, and the other edge surface is swaged with a curved die and simultaneously forces said one edge surface against the fixed die and thus the opposite edge surfaces of the side bar are each mechanically deformed to the inwardly curved form at the same time.

5. The method of producing a side bar for a chain link as recited in claim 3 in which said side bar is mechanically deformed by cold working each of the opposite edge surfaces of the side bar.

6. The method of producing a side bar for a chain link as recited in claim 3 in which the opposite edge surfaces of the side bar are heated to a softened condition following which the opposite edge surfaces are mechanically deformed to the inwardly curved form while they are in the softened condition.

7. The method of producing a side bar for a chain link as recited in claim 1 in which said one edge surface of the side bar is mechanically deformed to an inwardly curved and laterally expanded form while the side bar is held with the opposite side surfaces thereof supported in confinement to provide an enlarged curved bearing surface on the one edge surface of the side bar.

8. The method of producing a side bar for a chair link as recited in claim 7 in which the side bar is clamped by oppositely disposed dies that bear against the opposite side surfaces of the side bar and are curved and are recessed adjacent said one edge surface of the side bar for deformation of the one edge surface to the curvature of the dies and for expansion of the one edge surface laterally into the recesses of the dies to provide an enlarged curved bearing surface on the one edge surface of the side bar.

9. The method of producing a side bar for a chain link as recited in claim 7 in which said side bar is mechanically deformed by cold working each of the opposite edge surfaces of the side bar.

10. The method of producing a side bar for a chain link as recited in claim 7 in which the opposite edge surfaces of the side bar are heated to a softened condition following which the opposite edge surfaces are mechanically deformed to the inwardly curved and laterally expanded form while they are in the softened condition.

11. The method of producing a side bar for a chain link as recited in claim 1 in which each of said opposite edge surfaces of the side bar is mechanically deformed to an inwardly curved and laterally expanded form while the side bar is held with the opposite side surfaces thereof supported in confinement to provide an enlarged curved bearing surface on each of the opposite edge surfaces of the side bar.

12. The method of producing a side bar for a chain link as recited in claim 11 in which the side bar is clamped by oppositely disposed dies that bear against the opposite side surfaces of the side bar and are curved and are recessed adjacent each of said opposite edge surfaces of the side bar for deformation of the opposite edge surfaces to the curvature of the dies and for expansion of the opposite edge surfaces of the side bar laterally into the recesses of the dies to provide enlarged curved bearing surfaces on each of the opposite edge surfaces of the said bar.

13. The method of forming a side bar for a chain link in which the side bar has opposite side surfaces and opposite edge surfaces comprising the steps, clamping the side bar on the opposite side surfaces to hold the side bar and to support the opposite side surfaces in confinement, and mechanically deforming one edge surface of the side bar while the opposite side surfaces are supported in confinement to produce an inward curvature of the edge surface for a curved bearing surface on the one edge surface of the side bar.

14. The method of forming a side bar for a chain link as recited in claim 13 including laterally expanding said one edge surface of the side bar during the mechanical deformation thereof to provide an enlarged curved bearing surface.

15. The method of forming a side bar for a chain link as recited in claim 13 including mechanically deforming both said opposite edge surfaces of the side bar while the opposite side surfaces are supported in confinement to produce an inward curvature of each of the opposite edge surfaces for a curved bearing surface on each edge surface of the side bar.

16. The method of forming a side bar for a chain link as recited in claim 15 including laterally expanding both said opposite edge surfaces of the side bar during the mechanical deformation thereof to provide an enlarged curved bearing surface.

17. The method of forming a side bar for a chain link as recited in claim 13 including laterally offsetting the ends of the side bar relatively to each other.

18. The method of forming a side bar for a chain link as recited in claim 13 including punching a hole in each end of the side bar to establish the pitch of the chain link, and shaving each hole.

19. The method of forming a side bar for a chain link as recited in claim 13 including blanking the side bar from stock material.

20. The method of forming a side bar for a chain link as recited in claim 14 in which said one edge surface of the side bar is mechanically deformed by a cold working operation.

21. The method of forming a side bar for a chain link as recited in claim 14 in which said one edge surface of the side bar is heated to a softened condition and is mechanically deformed while the edge surface is in such softened condition.